(12) United States Patent
Knauer et al.

(10) Patent No.: US 9,797,290 B2
(45) Date of Patent: Oct. 24, 2017

(54) METHOD FOR THE REGENERATION OF A PARTICLE FILTER, AND INTERNAL COMBUSTION ENGINE WITH PARTICLE FILTER

(71) Applicant: MAN Truck & Bus AG, Munich (DE)

(72) Inventors: Markus Knauer, Schwarzenbruck (DE); Dieter Rothe, Nuremberg (DE); Christian Pastoetter, Nuremberg (DE)

(73) Assignee: MAN TRUCK & BUS AG, Munich (DE)

( * ) Notice: Subject to any disclaimer, the term of this patent is extended or adjusted under 35 U.S.C. 154(b) by 0 days.

(21) Appl. No.: 14/311,458

(22) Filed: Jun. 23, 2014

(65) Prior Publication Data
US 2017/0030242 A1    Feb. 2, 2017

(30) Foreign Application Priority Data
Jul. 16, 2013    (DE) ........................ 10 2013 011 806

(51) Int. Cl.
| | |
|---|---|
| *F01N 3/00* | (2006.01) |
| *F01N 9/00* | (2006.01) |
| *F01N 3/023* | (2006.01) |
| *F01N 3/025* | (2006.01) |

(52) U.S. Cl.
CPC ............ *F01N 9/005* (2013.01); *F01N 3/023* (2013.01); *F01N 3/0253* (2013.01); *F01N 9/002* (2013.01); *F01N 2900/0412* (2013.01); *F01N 2900/0418* (2013.01); *F01N 2900/0601* (2013.01); *F01N 2900/1606* (2013.01); *Y02T 10/47* (2013.01)

(58) Field of Classification Search
CPC .......... F01N 9/002; F01N 9/005; F01N 3/023; F01N 3/0253; F01N 2900/0412
USPC .......................................................... 60/274
See application file for complete search history.

(56) References Cited

FOREIGN PATENT DOCUMENTS

JP    2010101205 A    5/2010

OTHER PUBLICATIONS

English translation of Japanese Patent Appplication Publication No. JP 2010-101205A (May 2010).*
English translation of the article by Fiebig et al. entitled "Einflussse Motorishcer Betriebsparameter Auf Die reaktivitat Von Dieselruss", Jul. 8, 2010.*
Dipl.-Ing. Michael Fiebig, Dipl.-Ing. Markus Schönen, Dipl.-Ing. Ulrich Grütering, Prof. Dr.-Ing. Stefan Pischinger, Einflüsse Motorischer Betriebsparameter Auf Die Reaktivität Von Dieselruss, Forschung Emissionen, Jul. 8, 2010, 8 pgs.
European Patent Office, European Search Report, dated Dec. 12, 2014, 2 pgs.

* cited by examiner

*Primary Examiner* — Jason Shanske
(74) *Attorney, Agent, or Firm* — Lucas & Mercanti, LLP

(57) ABSTRACT

A method and an internal combustion engine for the regeneration of a particle filter includes periodic regeneration phases, where a regeneration is performed by virtue of the soot particles that have been deposited in the particle filter being burned off. During the operation of the internal combustion engine, the reactivity of the soot deposits is determined on the basis of a characteristic map previously established empirically for different engine operating ranges of the internal combustion engine.

14 Claims, 2 Drawing Sheets

METHOD FOR THE REGENERATION OF A PARTICLE FILTER, AND INTERNAL COMBUSTION ENGINE WITH PARTICLE FILTER

CROSS-REFERENCE TO RELATED APPLICATIONS

This application claims the priority of DE 10 2013 011 806.9 filed Jul. 16, 2013, which is incorporated by reference herein.

BACKGROUND OF THE INVENTION

The invention relates to a method for the regeneration of a particle filter and to an internal combustion engine having a particle filter for carrying out the method.

An exhaust-gas purification device of a diesel engine generally comprises a particle filter in which soot particles which are formed during the combustion of the fuel and which are contained in the exhaust-gas flow are prevented from passing into the environment. With progressive operating duration, the particle filter becomes ever more heavily laden with soot particles, and must be regenerated in order to maintain its effectiveness. For this purpose, regeneration phases are provided, within which the soot particles are burned off. Conventionally, for this purpose, fuel is supplied to the exhaust-gas flow upstream of a diesel oxidation catalytic converter that is provided, such that a reaction occurs in the diesel oxidation catalytic converter, resulting in a temperature increase of the exhaust-gas flow. The hot exhaust-gas flow whose temperature has been increased then causes the burn-off of the soot particles in the particle filter.

The burn-off of the soot particles is dependent on the reactivity of the soot particles deposited in the particle filter, such that correspondingly higher or lower exhaust-gas temperatures can be used for the burn-off of the soot particles. The frequency of the regeneration intervals may also be defined as a function of the soot amount and the soot condition of the soot particles deposited in the particle filter.

DE 10 2005 046 830 A1 discloses a method for the operation of an internal combustion engine with a particle filter, in which method the fuel combustion in the internal combustion engine is manipulated such that incompletely graphitized soot particles are deposited in the particle filter. By means of an increase in temperature of the exhaust-gas flow, said soot particles can then be ignited in order to initiate a regeneration phase.

BRIEF SUMMARY OF THE INVENTION

An object of the present invention is to provide a method for the regeneration of a particle filter of an internal combustion engine, in which method the soot deposits that form in a manner dependent on different operating states can be taken into consideration with regard to their condition and/or amount.

According to one embodiment, during the operation of the internal combustion engine, the reactivity of the soot deposits is determined on the basis of a characteristic map. Said characteristic map has preferably previously been established empirically for different engine operating ranges of the internal combustion engine, though if appropriate could alternatively or additionally also be established during defined operating phases of the internal combustion engine, in particular on the basis of certain calculated and/or detected operating parameters of the internal combustion engine. The preferred empirical determination of the condition of the soot deposits in the particle filter may for example be performed on an engine test stand and with corresponding laboratory tests of the soot deposits in the particle filter. Here, tests may for example be carried out to determine the condition of the soot deposits at full load or in predefined different part-load ranges. The deposited soot constituents may be tested, using laboratory technology, with regard to their reactivity. Furthermore, it is possible for the reactivity of the deposited soot particles to be determined in that, after a certain operating duration, the temperature of the exhaust-gas flow is raised to an increased value until an ignition of the soot particles occurs. The reactivity of the deposited soot particles can be inferred on the basis of the exhaust-gas temperature present here.

In general, the soot reactivity can be divided into highly reactive (temperature T less than or equal to 550° C.), reactive (temperature T greater than 550° C. to less than or equal to 600° C.), and slightly reactive (temperature T greater than 600° C.), wherein T is defined as the temperature of maximum burn-off in an atmosphere with 5% oxygen. The statements made above and below regarding the degree of reactivity of the soot preferably relate in each case to this definition of the soot reactivity.

If the reactivity values of the soot deposits are stored in a characteristic map for different engine operating ranges, it is possible, in normal operation, to very easily continuously determine the reactivity of the soot particles deposited in the particle filter. With the knowledge of the reactivity of the deposited soot particles, it is possible for the temperature of the exhaust-gas flow to be increased in a targeted manner, and in particular in a manner coordinated with the reactivity of the deposited soot particles, in order to initiate a regeneration phase. Here, it is possible in particular to avoid unnecessarily high exhaust-gas temperatures for the initiation of the regeneration phase, whereby it is possible to avoid the supply of unnecessarily large amounts of fuel for the exhaust-gas increase.

When a predefined maximum soot amount in the particle filter, which may also be referred to as soot load, is reached, a regeneration phase is initiated by means of an increase of the exhaust-gas temperature. Here, however, it is also possible to take into consideration the reactivity of the deposited soot particles, because in the case of a partially filled particle filter with a definedly large amount of reactive or highly reactive soot, it is expedient to perform an additional regeneration at a definedly predetermined low exhaust-gas temperature. The low exhaust-gas temperature is preferably at most 450° C., most preferably between 250° C. and 450° C. This measure also contributes to the optimization of the regeneration phases.

By contrast, in the case of a particle filter fully filled with soot of slight or low reactivity, a regeneration must be performed at a definedly predetermined high exhaust-gas temperature, preferably at a high exhaust-gas temperature of greater than 450° C., most preferably at a high exhaust-gas temperature of 450° C. to 600° C., which requires corresponding additional use of fuel.

By contrast, in the case of a particle filter fully filled with reactive soot or with high reactivity of the deposited soot, a regeneration can be performed at a lower exhaust-gas temperature. The low exhaust-gas temperature is preferably at most 450° C., most preferably between 250° C. and 450° C.

By means of the adaptation of the exhaust-gas temperature to the present reactivity of the deposited soot, an optimum adaptation of the exhaust-gas temperature for carrying out the regeneration phases is possible, whereby the additional fuel usage required for this purpose can be restricted to the amount of fuel required in each case. The process temperature can be controlled by means of a targeted supply of fuel into the exhaust-gas flow.

One refinement of the invention provides that, during additional manipulation phases, soot of high reactivity is introduced in a targeted manner into the particle filter. Here, the additional manipulation phases may be defined on the basis of the reactivity, detected according to the invention, of the soot deposits. If soot deposits of high reactivity are present in the particle filter, it is possible to dispense with an additional manipulation phase. By contrast, it may be expedient to implement a corresponding additional manipulation phase if soot of very low reactivity is deposited in the particle filter and the particle filter is nearing the full loading state. An additional manipulation phase may then serve for introducing soot of high reactivity into the particle filter in order thereby to favourably influence a subsequent regeneration phase.

A further object of the invention is to provide an internal combustion engine having a particle filter, by means of which the method according to the invention for the regeneration of a particle filter can be carried out.

According to an embodiment of the present invention, the internal combustion engine has a controller which monitors the introduction of soot into the particle filter and which is connected to a characteristic map memory in which there is stored a characteristic map which characterizes the soot reactivity of the soot load in the particle filter. The controller determines the time and the temperature for a regeneration phase to be performed. On the basis of the characteristic map data, the soot introduced can be evaluated with regard to its reactivity as a function of ongoing engine operation. The controller may be part of an already existing control device which is provided for controlling the exhaust-gas purification system. In this way, it is possible in a relatively simple manner for the method according to the invention to be carried out taking into consideration characteristic map data.

It may also be provided that, within a manipulation phase, on the basis of the reactivity of the deposited soot in the particle filter, the controller specifies when and with what intensity a manipulation phase is to be performed.

The internal combustion engine is preferably arranged, as the drive engine, in a motor vehicle, such that an optimization of the operation of an exhaust-gas purification system with respect to the required regeneration phases is possible with the method according to the invention. Both a fuel saving and also a reduction in environmental pollution are thus achieved.

BRIEF DESCRIPTION OF THE DRAWINGS

The invention will be explained in more detail below on the basis of exemplary embodiments illustrated in the drawing, in which.

DETAILED DESCRIPTION OF THE INVENTION

Figure 1:
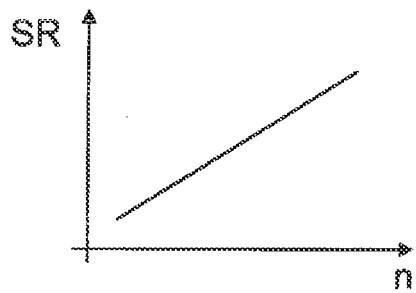
FIG. 1 to FIG. 4 show different characteristic curves of the soot reactivity as a function of different operating parameters of the internal combustion engine.

The characteristic curve illustrated in FIG. 1 shows, in simplified form, the profile of the soot reactivity SR as a function of the engine speed n of an internal combustion engine. The soot reactivity SR is in this case a measure of the reactivity of the soot that is generated by an internal combustion engine and deposited in a particle filter. Soot with high reactivity SR requires a lower activation energy than soot of low reactivity. Here, the activation energy is the energy that must be imparted to trigger a reaction, which in the present case is essential for the initiation of a regeneration phase in the particle filter.

Figure 2:
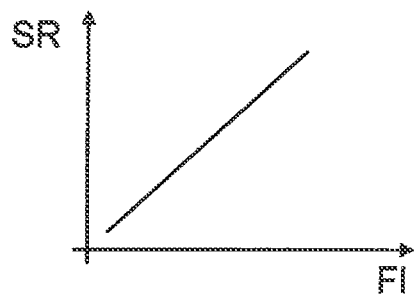
Figure 3:
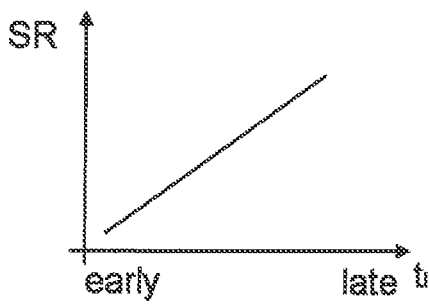

If an internal combustion engine is operated at high speed n, this has a favourable influence on soot reactivity. The characteristic curve illustrated in FIG. 2 shows the profile of the soot reactivity SR as a function of the fuel injection amount FI. The characteristic curve of FIG. 3 shows the soot reactivity SR as a function of the injection time $t_I$, wherein the soot reactivity is low in the case of an early injection time and is high in the case of a late injection time.

Figure 4:
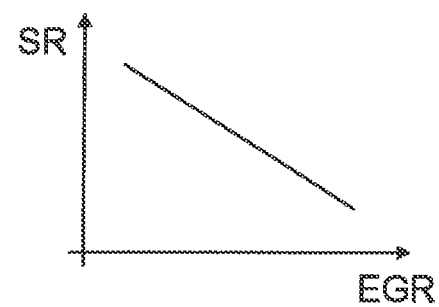

The characteristic curve of FIG. 4 relates to the exhaust-gas recirculation rate EGR of the internal combustion engine, according to which the soot reactivity SR decreases with progressively higher exhaust-gas recirculation rate EGR.

The characteristic curves of FIG. 1 to FIG. 4 and further characteristic curves that are dependent on engine operating parameters may be established for a particular internal combustion engine on an engine test stand. As further operating parameters of an internal combustion engine, consideration may be given to the pressure in the pressure accumulator of a common rail system, wherein here, the soot reactivity likewise increases with increasing rail pressure.

The different dependencies of the soot reactivity SR on the different engine operating parameters may be recorded in an engine-specific characteristic map, such that said characteristic map can then be used, in normal operation of the internal combustion engine, for determining the soot reactivity of the soot deposited in the particle filter. The soot reactivity SR may be described on the basis of the following equation:

$$SR = a \cdot P + b \cdot FI + c \cdot EGR + d \cdot n + e \cdot t_I + \ldots$$

The factors a, b, c, d, e serve for the weighting of the individual operating parameters in the overall soot reactivity SR of the soot deposited in the particle filter. Said factors can be assigned to the individual operating parameters on the basis of measurements on an engine test stand, such that precise statements can be made regarding the reactivity of the soot deposited in the soot particle filter as a function of different operating ranges of an internal combustion engine.

Figure 5:
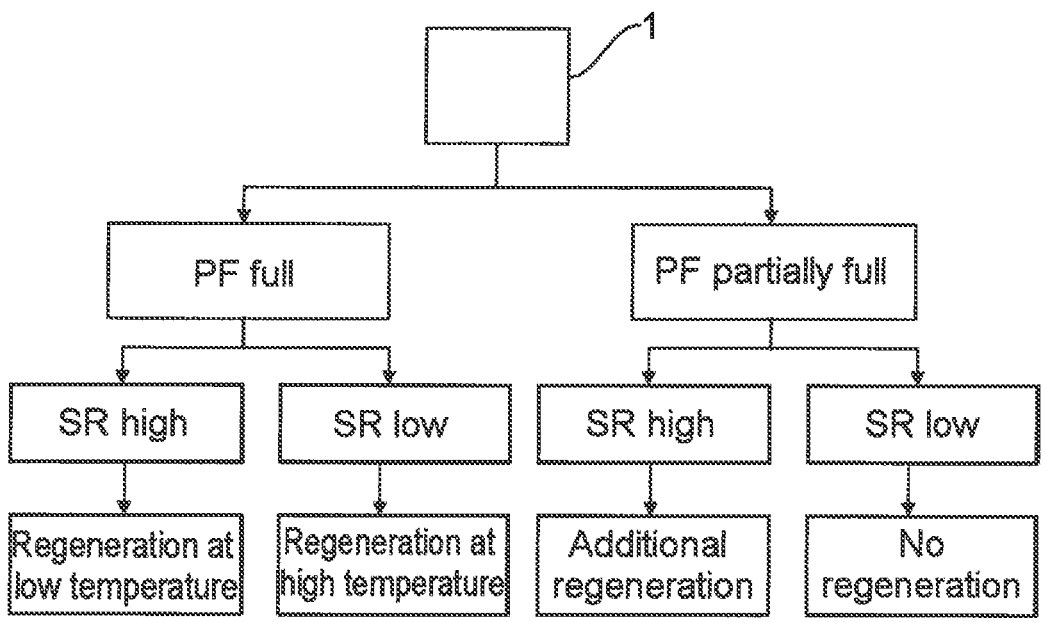
FIG. 5 shows a flow diagram for the execution of regeneration phases.

The flow diagram of FIG. 5 shows different approaches dependent on different soot reactivities. The internal combustion engine 1 is initially in normal engine operation, with various operating ranges being run through over a relatively long period of time. By means of continuous measurement, such as is known per se, of the pressure difference between the inlet and the outlet of the particle filter, statements can be made regarding how much soot has been deposited in the particle filter PF. If it is established here that the particle filter PF is partially filled, a decision may furthermore be made, as a function of the reactivity of the soot, as to whether no regeneration should be performed or whether an additional regeneration should be carried out at low temperature. In the flow diagram of FIG. 5, in the case of a partially filled particle filter PF, an additional regeneration takes place only if the deposited soot exhibits high soot reactivity.

The left-hand part of the flow diagram of FIG. 5 shows the situation when the particle filter PF is full. If it is established in the subsequent step that soot of high reactivity is deposited in the particle filter, a regeneration is performed at low temperature. By contrast, if it is established that the soot deposited in the particle filter exhibits only low reactivity, a regeneration is performed at high temperature, which requires the supply of a correspondingly large amount of fuel into the exhaust-gas flow upstream of the diesel oxidation catalytic converter.

The flow diagram of FIG. 5 shows only a selection of approaches for the initiation and execution of regeneration phases.

Figure 6:
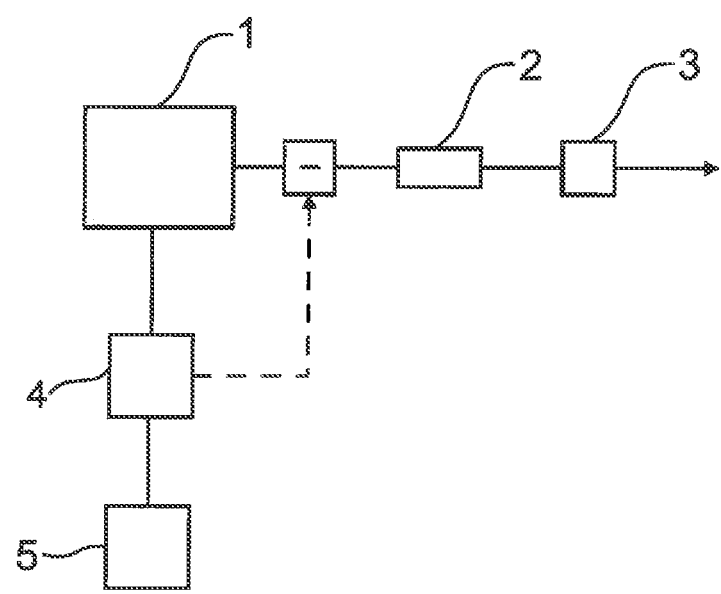
FIG. 6 shows a block circuit diagram of an internal combustion engine having a diesel oxidation catalytic converter and a particle filter.

FIG. 6 shows a simplified illustration of a block circuit diagram of an internal combustion engine 1 with a diesel oxidation catalytic converter 2 and a particle filter 3 of the exhaust-gas purification system of the internal combustion engine 1. The direction of the exhaust-gas flow is indicated by an arrow. A controller 4 assigned to the internal combustion engine 1 is connected to a characteristic map memory 5 in which there may be stored one or more characteristic maps which specify, as a function of different engine operating ranges of the internal combustion engine 1, the soot reactivity SR of the soot deposited in the particle filter 3.

For the initiation of a regeneration phase, the controller 4 can, via a dashed control line 6, trigger a supply of fuel into the exhaust-gas flow, wherein the supply of fuel is selected such that a desired temperature increase in the exhaust-gas flow is achieved. The time and the amount of fuel supplied are determined by the controller 4 on the basis of at least one characteristic map that is stored in the characteristic map memory 5.

It is additionally possible for the controller 4 to adjust the internal combustion engine 1 in a targeted manner such that soot of high reactivity passes to the particle filter 3 in the exhaust-gas flow. This can contribute to the assistance of the initiation and execution of a regeneration phase.

The invention claimed is:

1. A method of regenerating a particle filter of an internal combustion engine, comprising the steps of:
    performing, during a periodic regeneration phase, regeneration in which soot deposits in the particle filter are burned off, the soot deposits comprising soot particles deposited in the particle filter;
    determining, during operation of the internal combustion engine, a soot reactivity of the soot deposits on the basis of a characteristic map saved in a memory;
    determining, during operation of the internal combustion engine, an amount of the soot deposits in the particle filter;
    defining a time at which the regeneration phase is performed based on the amount of the soot deposits and the soot reactivity of the soot deposits, and
    determining a process temperature for the regeneration phase based on the amount of the soot deposits and the soot reactivity of the soot deposits.

2. The method of claim 1, wherein the characteristic map is previously established empirically for different engine operating ranges of the internal combustion engine.

3. The method of claim 1, further comprising establishing the characteristic map by operating the internal combustion engine in different engine operating ranges on an engine test stand, and determining a soot reactivity for each of the different engine operating ranges and storing the determined soot reactivity in the characteristic map as a function of the different engine operating phases.

4. The method according to claim 1, wherein when the particle filter is partially filled and the soot deposit includes a predetermined fraction of reactive or highly reactive soot, a regeneration is performed at a low exhaust-gas temperature of up to 450° C.

5. The method of claim 4, wherein the low exhaust-gas temperature is 250° C. to 450° C.

6. The method according to claim 1, wherein when the particle filter is fully filled and the soot deposit includes a predetermined fraction of slightly reactive soot, a regeneration is performed at a high exhaust-gas temperature of greater than 450° C.

7. The method of claim 6, wherein the high exhaust-gas temperature is 450° C. to 600° C.

8. The method according to claim 1, wherein when the particle filter is fully filled and the soot deposit includes a predetermined fraction of reactive or highly reactive soot, a regeneration is performed at a low exhaust-gas temperature of up to 450° C.

9. The method of claim 8, wherein the low exhaust-gas temperature is 250° C. to 450° C.

10. The method of claim 1, further comprising controlling a process temperature during the regeneration by adding a targeted supply of fuel into the exhaust-gas flow upstream of a catalytic converter.

11. The method of claim 1, further comprising introducing soot having a high reactivity into the particle filter.

12. An internal combustion engine, comprising:
    a particle filter in which soot particles from an exhaust gas flow of the internal combustion engine are deposited;
    a controller monitoring an introduction of the soot particles into the particle filter;
    a characteristic map memory connected to the controller, the characteristic map memory storing a characteristic map categorizing a soot reactivity of the soot particles deposited in the particle filter,
    wherein the controller determines, during operation of the internal combustion engine, an amount of the soot deposits in the particle filter, determines a time at which a regeneration phase of the particle filter is performed based on the amount of the soot deposits and the soot reactivity of the soot deposits, and determines a process temperature for the regeneration phase based on the amount of the soot deposits and the soot reactivity of the soot deposits.

13. The internal combustion engine of claim 12, the controller adjusting operation of the internal combustion engine so that soot of high soot reactivity is formed and deposited in the particle filter.

14. A motor vehicle having an internal combustion engine according to claim 12.

* * * * *